United States Patent
Nishide et al.

(10) Patent No.: US 7,655,347 B2
(45) Date of Patent: Feb. 2, 2010

(54) BATTERY AND METHOD OF ASSEMBLING BATTERY

(75) Inventors: Yukimasa Nishide, Toyota (JP); Toru Nakai, Nagoya (JP); Hiroshi Ueshima, Anjo (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 82 days.

(21) Appl. No.: 11/655,995

(22) Filed: Jan. 22, 2007

(65) Prior Publication Data

US 2007/0172722 A1    Jul. 26, 2007

(30) Foreign Application Priority Data

Jan. 24, 2006    (JP) .............................. 2006-015514

(51) Int. Cl.
*H01M 2/12* (2006.01)
(52) U.S. Cl. .......................................... 429/53; 429/56
(58) Field of Classification Search .................. 429/53, 429/56, 72, 73, 82, 163, 86; 29/623.1, 623.2, 29/623.4
See application file for complete search history.

(56) References Cited

U.S. PATENT DOCUMENTS 6,634,649 B1 * 10/2003 Yamaguchi et al. ......... 277/634

2003/0017393 A1    1/2003    Nemoto et al.
2006/0105228 A1 *  5/2006    Kim et al. ...................... 429/56
2006/0275657 A1 * 12/2006    Kozuki et al. ............... 429/185

FOREIGN PATENT DOCUMENTS

JP    09-293490    11/1997
JP    10-106524    4/1998

OTHER PUBLICATIONS

Chinese Office Action dated Jun. 6, 2008.

* cited by examiner

*Primary Examiner*—Patrick Ryan
*Assistant Examiner*—Monique Wills
(74) *Attorney, Agent, or Firm*—Finnegan, Henderson, Farabow, Garrett & Dunner, LLP

(57) ABSTRACT

A battery includes a casing made of metal; and a safety valve made of a thin plate. The casing includes a vent hole that provides communication between the inside of the battery and the outside of the battery. A seal member made of synthetic resin is provided between the peripheral edge portion around the vent hole and the peripheral edge portion of the safety valve. The seal member connects the peripheral edge portion around the vent hole to the peripheral edge portion of the safety valve such that the peripheral edge portion around the vent hole does not contact the peripheral edge portion of the safety valve.

4 Claims, 4 Drawing Sheets

BATTERY AND METHOD OF ASSEMBLING BATTERY

INCORPORATION BY REFERENCE

The disclosure of Japanese Patent Application No. 2006-015514 filed on Jan. 24, 2006, including the specification, drawings and abstract is incorporated herein by reference in its entirety.

BACKGROUND OF THE INVENTION

1. Field of the Invention

The invention relates to a battery that includes a safety valve that is opened when pressure in the battery increases, and a method of assembling the battery.

2. Description of the Related Art

When a battery is used, gas is generated in the battery due to an electrode reaction. The pressure in the battery increases due to the generated gas. The pressure in the battery increases particularly due to the over-charge or over-discharge of the battery. In general, a sealed battery is provided with a safety valve that opens a part of a casing to prevent an excessive increase in the pressure in the battery when the pressure in the battery increases.

Japanese Patent Application Publication No. JP-A-10-106524 (hereinafter, referred to as "Publication No. 10-106524") describes a device in which a safety valve is formed in a casing. In the device, a thin area is formed in a cover made of a metallic plate. The thin area is the thinnest area in the cover. The thin area functions as the safety valve. When the pressure in the battery increases, a part of the thin area is broken to prevent an excessive increase in the pressure in the battery. Japanese Patent Application Publication No. JP-A-9-293490 (hereinafter, referred to as "Publication No. 9-293490") describes a battery and a method of assembling the battery, in which the peripheral edge portion of a safety valve is welded to the peripheral edge portion around a vent hole of a casing.

When the safety valve is formed in a part of the casing made of metal as described in Publication No. 10-106524, or when the safety valve is welded to the casing made of metal as described in Publication No. 9-293490, impacts applied to the casing, or vibrations caused in the casing are directly transmitted to the safety valve. The safety valve is more fragile than the body of the casing. If the impacts applied to the casing are directly transmitted to the safety valve, the safety valve may be broken. If the vibrations caused in the casing are directly transmitted to the safety valve, the safety valve may deteriorate. If the safety valve deteriorates, the safety valve may be opened even when the pressure in the battery is below a predetermined value.

SUMMARY OF THE INVENTION

A first aspect of the invention relates to a battery that includes a casing made of metal, and a safety valve made of a thin plate. The casing includes a vent hole that provides communication between the inside of the battery and the outside of the battery. The safety valve closes the vent hole of the casing. In the battery according to the invention, a synthetic resin seal member is provided between the peripheral edge portion around the vent hole and the peripheral edge portion of the safety valve. The seal member connects the peripheral edge portion around the vent hole of the casing to the peripheral edge portion of the safety valve such that the peripheral edge portion around the vent hole does not contact the peripheral edge portion of the safety valve.

In the first aspect, the safety valve is configured to be broken when the pressure in the battery reaches a predetermined value. The safety valve is more fragile than any other area that forms the outer periphery of the battery (i.e., the casing). If impacts applied to the casing from the outside of the battery are directly transmitted to the safety valve, the safety valve may be broken. If vibrations caused in the casing are directly transmitted to the safety valve continuously or intermittently for a long time, the safety valve may deteriorate. As a result, the safety valve may be broken even when the pressure in the battery is below a predetermined value.

Impacts or vibrations are less likely to be transmitted through synthetic resin than metal. Therefore, the seal member absorbs the impacts applied to the area other than the safety valve in the battery, or the vibrations caused in the area other than the safety valve in the battery, before the impacts or vibrations are transmitted to the safety valve. Thus, after the impacts or vibrations applied from the outside of the battery are weakened, the impacts or vibrations are transmitted to the safety valve. Accordingly, in the first aspect, the safety valve is hardly broken by the impacts applied from the outside of the battery. Also, even if vibrations are continuously or intermittently caused in the casing, the safety valve hardly deteriorates.

Any battery that includes a safety valve and a casing made of metal may be employed as the battery according to the first embodiment. The type and outer shape of the battery are not limited to a particular type and a particular outer shape. For example, the invention may be applied to a primary battery, a secondary battery, and a capacitor. The shape of the casing is not limited to a particular shape. For example, the invention may be applied to a square battery, a cylindrical battery, a button battery, and a plate battery.

The safety valve may be formed in any area in the casing. The area where the safety valve is formed is not limited to a particular area. For example, when the casing includes a housing that has an opening, and a cover that closes the opening, the safety valve may be formed in the cover, or an area in the housing. The safety valve may be disposed in an appropriate area taking into account the conditions for the use of the battery, or the conditions for the installation of the battery.

The safety valve may have any configuration, that is, the configuration of the safety valve is not limited to a particular configuration, as long as the safety valve is made of a thin plate that is preferentially broken when the pressure in the battery increases. For example, the same material as that used to form the casing may be selected to form the safety valve. In this case, a plate thinner than the wall portion of the casing may be employed to form the safety valve. A groove may be formed on the surface of the thin plate so that the groove is broken when the pressure in the battery increases.

The safety valve may have any shape, as long as the safety valve and the seal member close the vent hole of the casing. That is, the shape of the safety valve is not limited to a particular shape. The contour of the safety valve may be substantially the same as, or slightly larger than, or slightly smaller than the contour of the vent hole of the casing.

Any synthetic resin that can absorb vibrations and impacts may be employed as the seal member. That is, the seal member is not limited to a particular resin. Typical synthetic resins may include rubber-type polymers such as silicon rubber and isoprene rubber, and various elastomers. When the configuration of the battery according to the invention is applied to the lithium-ion secondary battery, the seal member may be made of synthetic resin material resistant to organic solvent that is used to generate the electrolyte. When the invention is applied to the lithium-ion secondary battery, the seal member may be made of polyolefin resins such as polypropylene (PP) resins and polyethylene (PE) resins, and crystal engineering plastic material such as polyphenylene sulfide (PPS) resins and liquid crystal polymer (LCP) compounds. When the invention is applied to the nickel-hydrogen battery, the synthetic resin material resistant to a strong alkali aqueous solution, which is the electrolyte, may be selected to form the seal member. The material generated by kneading an ordinary synthetic resin and a rubber polymer or an elastomer may be used.

In the above-described aspect, the peripheral edge portion around the vent hole of the casing may be connected to the peripheral edge portion of the safety valve by an insert molding process. During the insert molding process, the casing and the safety valve may be set in an injection mold according to a predetermined positional relation, and then synthetic resin may be filled in the injection mold to form the seal member by injection molding.

BRIEF DESCRIPTION OF THE DRAWINGS

The foregoing and/or further objects, features and advantages of the invention will become more apparent from the following description of example embodiments with reference to the accompanying drawings, in which the same or corresponding portions are denoted by the same reference numerals and wherein.

DETAILED DESCRIPTION OF THE EXAMPLE EMBODIMENTS

In the following description, example embodiments of the present invention will be described in more detail.

The followings are the main features of a battery according to a first embodiment or a second embodiment that will be described in detail.

i) The battery is a lithium-ion secondary battery.

ii) The battery includes terminals that extend from the inside of a casing to the outside of the casing.

iii) In the battery, the terminals are connected to the casing via resin.

iv) The casing of the battery includes a housing that has an opening, and a cover that closes the opening. The peripheral edge portion around the opening of the housing may be welded to the cover.

v) A safety valve is formed in the cover of the casing.

vi) The casing is made of an aluminum plate.

vii) The safety valve is made of an aluminum plate.

viii) A seal member is provided along the entire peripheral edge portion of the safety valve.

ix) The safety valve is provided in the cover, and substantially the entire area of the cover is coated with the seal member. (Second embodiment)

First Embodiment

Figure 1:
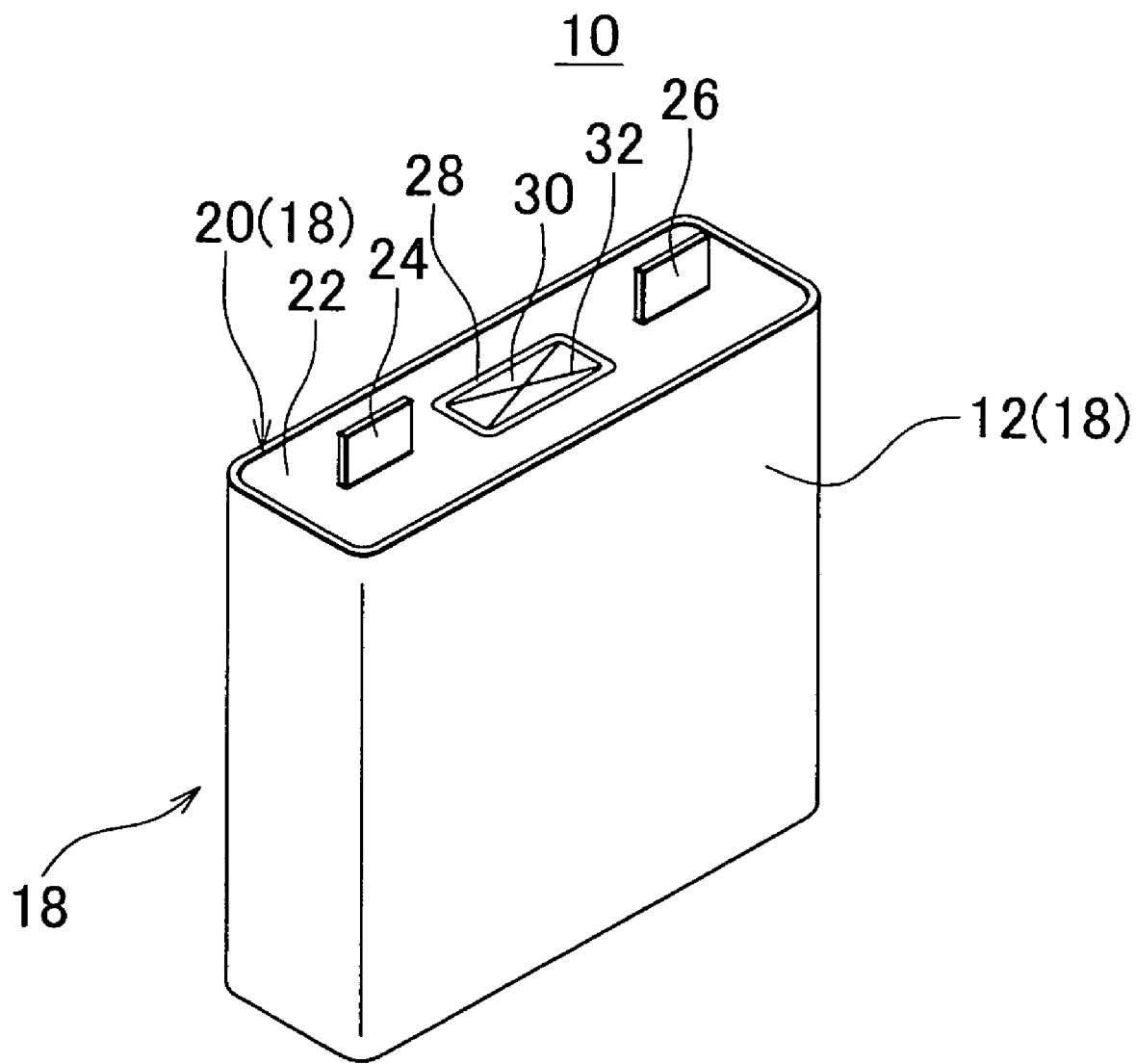
FIG. 1 is a perspective view of a battery according to a first embodiment of the invention.

As shown in FIG. 1, the battery 10 according to the embodiment includes an aluminum casing 18 that includes the cover 20 and a housing 12. Elements for generating electric power (hereinafter, referred to as "power-generation elements"), such as an electrode assembly 16 and an electrolyte, are housed in the casing 18.

The electrode assembly 16 is a roll-type electrode assembly formed by stacking a positive-electrode sheet and a negative-electrode sheet via a separator, and rolling the stacked positive-electrode sheet, negative-electrode sheet, and the separator such that the electrode assembly 16 has a flat shape. The electrode assembly 16 (refer to FIG. 3) and the electrolyte are the power-generation elements in the lithium-ion secondary battery 10. The positive-electrode sheet includes a current-collecting foil made of aluminum. Layers of positive-electrode active material are provided on the front and back sides of the current-collecting foil. The positive-electrode sheet is connected to a positive-electrode terminal 24. The positive-electrode terminal 24 is made of an aluminum plate. The positive terminal 24 is fixed to the cover 20. The negative-electrode sheet includes a current-collecting foil made of copper. Layers of negative-electrode active material are provided on the front and back sides of the current-collecting foil. The negative-electrode sheet is connected to a negative-electrode terminal 26. The negative-electrode terminal 26 is made of a copper plate. The negative-electrode terminal 26 is fixed to the cover 20. The separator is a porous polyolefin sheet. The separator is impregnated with the electrolyte.

As described above, the electrolyte is the power-generation element in the battery 10. A conventionally-known liquid non-aqueous electrolyte or gelled polymer electrolyte for the lithium-ion secondary battery may be employed as the electrolyte. For example, it is possible to employ the electrolyte generated by dissolving lithium hexafluoride ($LiPH_6$), which is lithium salt, in mixed solvent of diethyl carbonate (DEC) and ethylene carbonate (EC) (e.g., mixed solvent generated by mixing DEC and EC at the mass ratio of 7:3).

The housing 12 of the casing 18 is a substantially rectangular parallelepiped. In the housing 12, four sidewalls form the peripheral edge of the rectangular opening that has rounded corners. The four sidewalls are composed of a pair of sidewalls having a wide width, and a pair of sidewalls having a narrow width. The sidewalls having a wide width correspond to the long sides of the opening. The sidewalls having a narrow width correspond to the short sides of the opening. The adjacent sidewalls are continuous with each other. The areas where the sidewalls contact each other are rounded.

Figure 2:
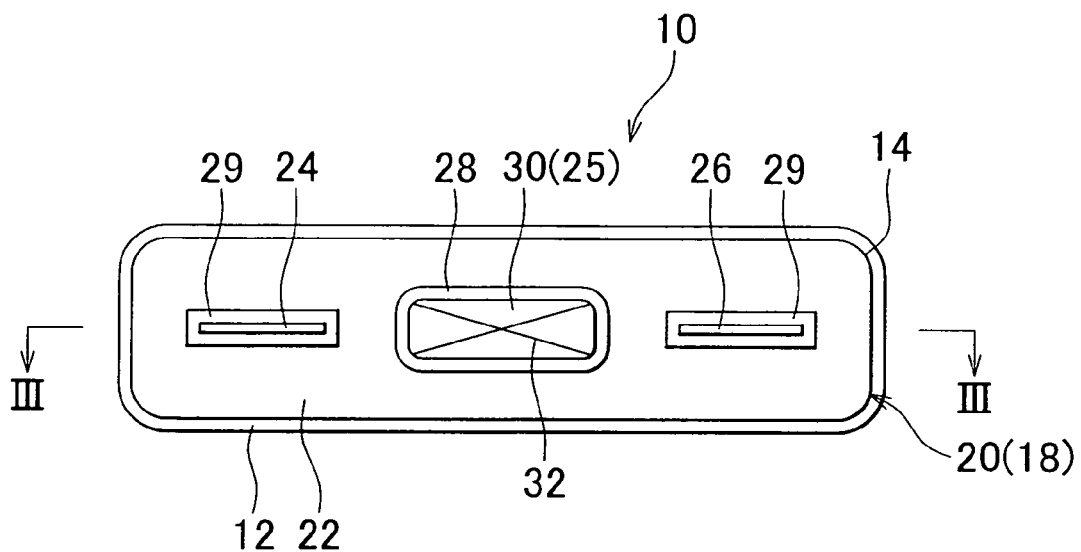
FIG. 2 is a plan view of the battery according to the first embodiment of the invention.

The cover 20 of the casing 18 is rectangular, and has rounded corners. The cover 20 is connected to the housing 12 such that the cover 20 is fitted in the opening of the housing 12. As shown in the sectional view in FIG. 3, the cover 20 has a through-hole 21 for the positive-electrode terminal 24, and a through-hole 23 for the negative-electrode terminal 26. The positive-electrode terminal 24 and the negative-electrode terminal 26 extend from the electrode assembly 16 in the battery 10 through the through-holes 21 and 23, respectively. As shown in detail in FIG. 2, a vent hole 25 is formed at the center of the cover 20. The vent hole 25 is rectangular, and has rounded corners. The safety valve 30 and a seal member 28 are connected to the vent hole 25 such that the vent hole 25 is closed. Grooves 32 are formed in the safety valve 30. The grooves 32 cross each other at the substantially center position in the safety valve 30. If the pressure in the battery 10 increases, the area where the grooves 32 cross each other will break.

Figure 3:
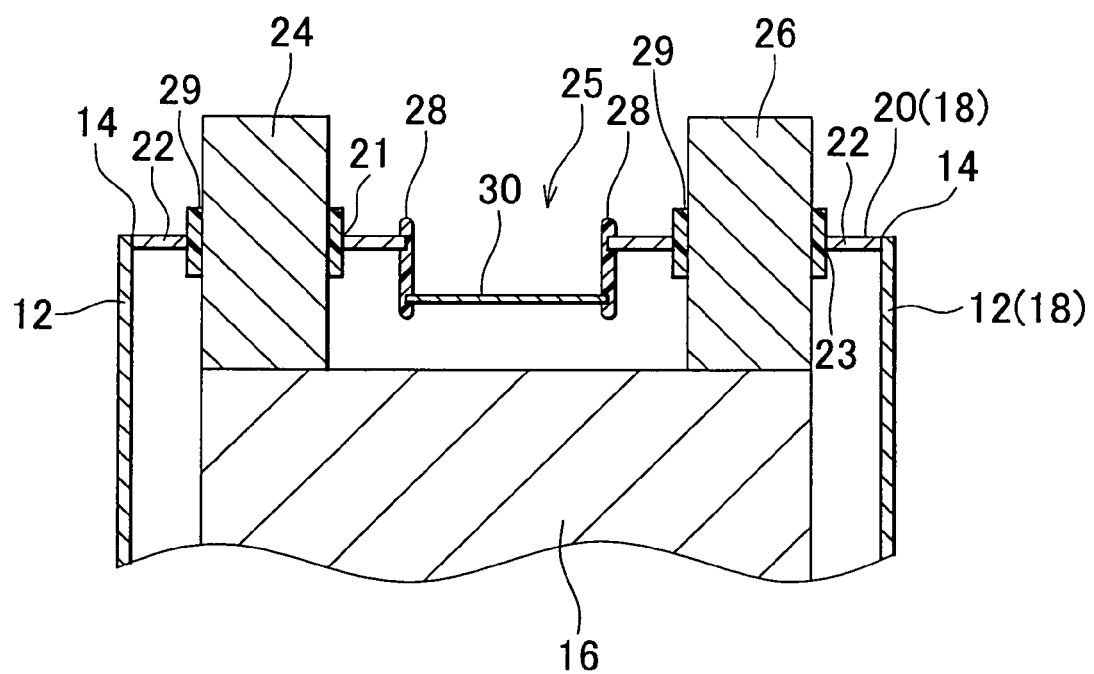
FIG. 3 is a sectional view taken along line III-III in FIG. 2.

The configurations of the vent hole 25 of the cover 20, seal member 28, and safety valve 30 will be described with reference to FIG. 3. FIG. 3 is a sectional view taken along line III-III. As shown in FIG. 3, the safety valve 30 is provided between the positive-electrode terminal 24 and the negative-electrode terminal 26. The contour of the safety valve 30 is substantially the same as the contour of the vent hole 25 of the cover 20. The safety valve 30 is provided in the battery 10 at the position inside the cover 20. That is, the safety valve 30 is provided at the position lower than the surface of the cover 20.

The seal member 28 connects the peripheral edge portion around the vent hole 25 to the peripheral edge portion of the safety valve 30. The seal member 28 may be made of polyphenylene sulfide (PPS), which is capable of absorbing vibrations and impacts. In addition to polyphenylene sulfide (PPS), polypropylene (PP), polyethylene (PE), liquid crystal polymer (LCP), and the like, may be used. Particularly, LCP and PPS have high heat resistance. LCP and PPS have high resistance to organic solvent that is used to generate the electrolyte. The seal member 28 may be formed using crystal engineering plastic material, such as LCP and PPS. The seal member 28 is provided along the entire peripheral edge portion of the safety valve 30, and along the entire peripheral edge portion around the vent hole 25. The seal member 28 has a vertically-long oval cross section. The peripheral edge portion of the safety valve 30 is inserted in the seal member 28. The peripheral edge portion around the vent hole 25, which is a part of the cover 20, is also inserted in the seal member 28. Because the seal member 28 is disposed between the safety valve 30 and the cover 20, the safety valve 30 does not contact the cover 20. An insulation member 29 is disposed between the positive-electrode terminal 24 and the cover 20. The insulation member 29 is also disposed between the negative-electrode terminal 26 and the cover 20. Because the insulation members 29 are disposed between a metallic plate 22 and the terminals 24 and 26, the terminals 24 and 26 are insulated from each other.

Next, the method for assembling the battery 10 will be described.

First, the cover 20 and the housing 12 of the casing 18 are prepared. The housing 12 made of metal includes the rectangular opening that has rounded corners, the four sidewalls that form the peripheral edge of the opening, and a bottom wall that is opposite to the opening.

The cover 20 is assembled according to the following procedure. First, the rectangular metallic plate 22 that has rounded corners is prepared. The metallic plate 22 has the through-holes 21 and 23, and the vent hole 25. The positive-electrode 24 extends through the through-hole 21, and the negative-electrode 26 extends through the through-hole 23. The metallic plate 22 has another through-hole (not shown), through which the electrolytic solution is supplied. The contour of the metallic plate 22 is substantially the same as the contour of the opening of the housing 12. Next, the surface of the peripheral edge portion around the vent hole 25, and the surface of the area near the peripheral edge portion are roughened. This allows the seal member 28 to be tightly connected to the peripheral edge portion around the vent hole 25. The method of roughening the surface is not limited to a particular method.

Next, the positive-electrode terminal 24 and the negative-electrode terminal 26 are passed through the through-holes 21 and 23, respectively. Then, the positive-electrode terminal 24 and the negative-electrode terminal 26 are fixed to the metallic plate 22. The insulation members 29 are disposed between the positive-electrode terminal 24 and the negative-electrode terminal 26 such that the positive-electrode terminal 24 and the negative-electrode terminal 26 are insulated from each other.

Next, the safety valve 30 is connected to the cover 20 using the seal member 28. The cover 20, safety valve 30, and seal member 28 are connected to each other by an insert molding process. During the insert molding process, the cover 20 and safety valve 30 are set in an injection mold according to a predetermined positional relation, and then synthetic resin is filled in the injection mold to form the seal member 28 by injection molding. Thus, the cover 20, safety valve 30, and seal member 28 are solidly connected to each other by this insert molding process.

The electrode assembly 16, which has been assembled beforehand, is connected to the positive-electrode terminal 24 and the negative-electrode terminal 26 that extend through the through-holes 21 and 23 of the cover 20. The positive-electrode terminal 24 is welded to the positive-electrode sheet of the electrode assembly 16. The negative-electrode terminal 26 is welded to the negative-electrode sheet of the electrode assembly 16. Because the electrode assembly 16 is assembled according to a conventional method, description of the method of assembling the electrode assembly 16 is omitted.

Next, the electrode assembly 16 connected to the cover 20 is inserted in the housing 12 through the opening of the housing 12. As a result, the cover 20 is fitted in the opening of the housing 12. The peripheral edge portion of the cover 20 may be laser welded to the peripheral edge portion around the opening of the housing 12 at the welding area 14 where they overlap each other. Then, the electrolyte is supplied through the electrolyte-inlet formed in the cover 20. Then, the electrolyte-inlet is tightly closed. Thus, the lithium-ion secondary battery 10 according to the embodiment is assembled.

A vibration test may be conducted on the battery 10 according to the embodiment. The vibration test may be conducted according to a test method specified in the recommendations for transport of hazardous material issued by United Nations. In the test, a comparative battery may be used. The comparative battery has the same specifications as those of the battery 10 according to the embodiment. In the comparative battery, a cover is directly connected to a safety valve by welding.

The vibration test will be described more specifically. In the test, the sine-curve signals from 7 to 200 Hz, which are obtained by log sweep, are used to cause vibrations.

The conditions relating to the log sweep rate of the vibrations in the test will be described. The vibrations are accelerated at the peak acceleration of 1 G (approximately 9.8 m/s$^2$) until the frequency of the vibrations reach 7 to 18 Hz. Then, the frequency may be increased to 50 Hz while maintaining the amplitude at 0.8 mm (total displacement: 1.6 mm), and changing the peak acceleration from 1 G to 8 G. Then, the frequency is increased to 200 Hz while maintaining the peak acceleration at 8 G. Subsequently, the frequency is maintained at 200 Hz for a while. Then, the frequency of the vibrations is decreased from 200 Hz to 7 Hz. The above-described process is performed in one cycle of the vibration test. It takes approximately 15 minutes to conduct one cycle of the vibration test. The vibration direction is changed among the three directions (the X-axis direction, Y-axis direction, and Z-axis direction in a three-dimensional coordinate) in the test. Twelve cycles of the test are conducted for each of the cases where the vibration direction is the X-axis direction, Y-axis direction, and Z-axis direction.

As a result of the above-described test, no flaw or crack is formed in the safety valve 30 in the battery 10 according to the embodiment. In the battery 10, the safety valve 30 is connected to the cover 20 via the seal member 28 such that safety valve 30 does not contact the cover 20. It is considered that the vibrations applied from the outside of the battery 10 are not directly transmitted to the safety valve 30, because the seal member 28 absorbs the vibrations. Even when strong vibrations are applied to the battery 10, the safety valve 30 is hardly damaged. The battery 10 is highly resistant to the force applied from the outside of the battery 10. Thus, the safety valve 30 is broken only when the pressure in the battery 10 increases, that is, the force is applied from the inside of the battery 10. As a result, the safety valve 30 is hardly broken when the pressure in the battery 10 is below a predetermined value.

In contrast, a plurality of small cracks are formed in the safety valve in the comparative battery. In the comparative battery, the cover is directly connected to the safety valve by welding. The vibrations applies from the outside of the battery are transmitted to the safety valve, without weakening the vibrations. Because the safety valve is thinner than the casing, the safety valve is easily damaged by the force applied from the outside of the battery 10. If small cracks are formed in the safety valve, the safety valve may be broken even when the pressure in the battery is below the predetermined value.

According to the results of the test, by providing the seal member 28, which has the effect of absorbing impacts, between the safety valve 30 and the cover 20, it is possible to prevent the safety valve 30 from being broken or damaged by the force applied from the outside of the battery. In the battery 10 that has the configuration according to the embodiment, the safety valve 30 is broken and the gas in the battery 10 is released when the pressure in the battery 10 reaches the predetermined value.

II. Second Embodiment

The configuration of the battery 110 in the second embodiment is the same as that of the battery 10 in the first embodiment, except for a positive-electrode terminal 124 and a negative-electrode terminal 126 that extend through the through-holes of the cover 120, and a seal member 135. Therefore, the description of the same components as those of the battery 10 in the first embodiment will be omitted.

Figure 4:
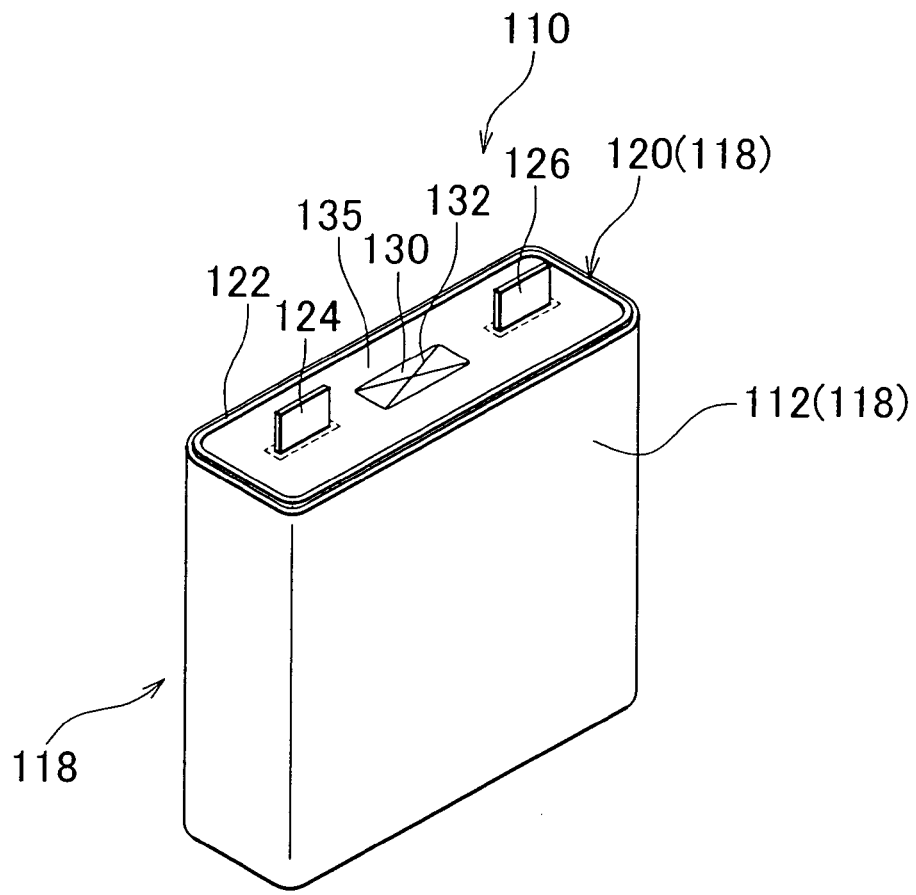
FIG. 4 is a perspective view of a battery according to a second embodiment of the invention.
Figure 5:
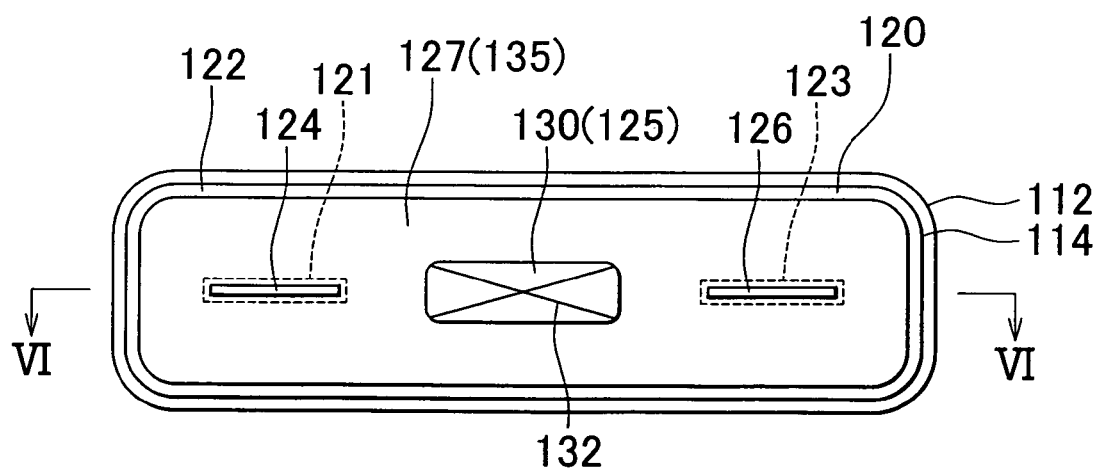
FIG. 5 is a plan view of the battery according to the second embodiment of the invention.

As shown in FIG. 4, the battery 110 includes an aluminum casing 118 that includes the cover 120 and a housing 112. In the casing 118, the power-generation elements, such as an electrode assembly 116 and the electrolyte, are housed.

Figure 6:
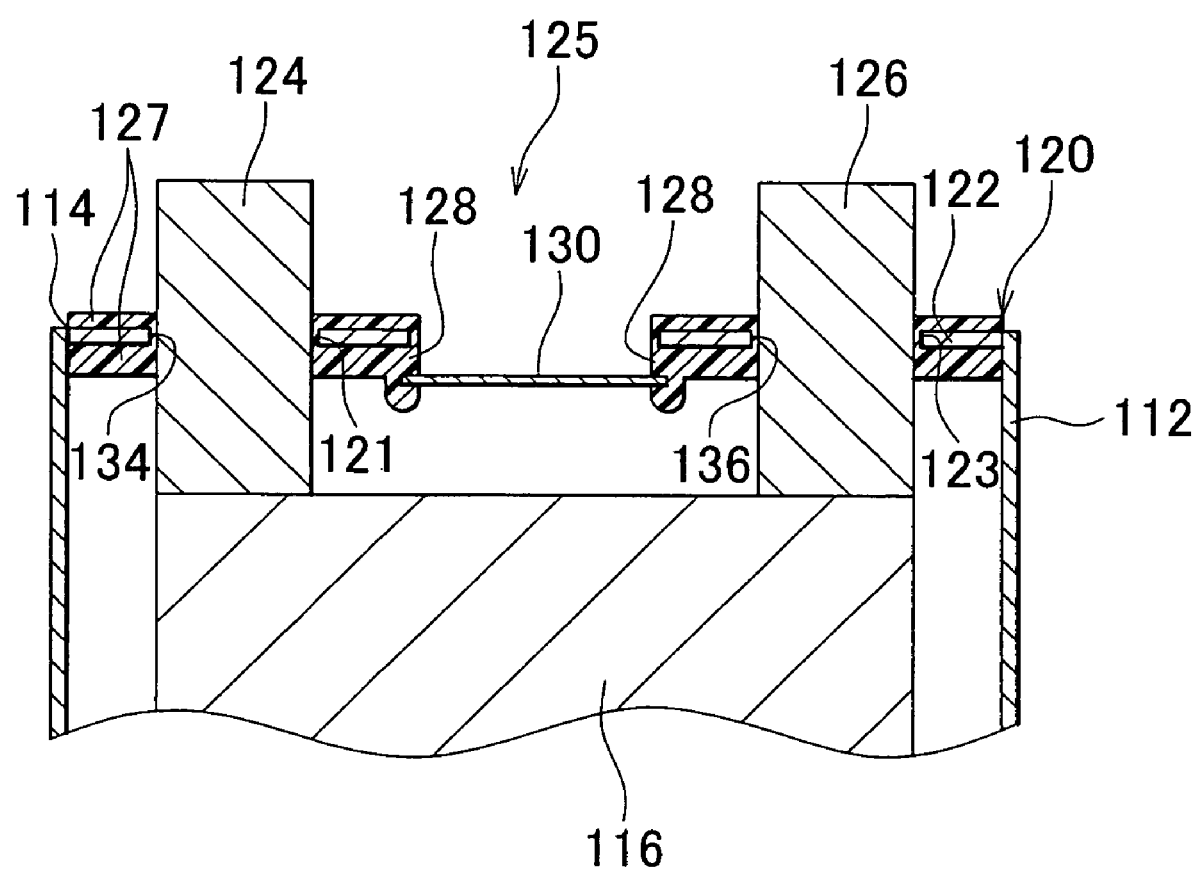
FIG. 6 is a sectional view taken along line VI-VI in FIG. 5.

The shape of the housing 112 is the same as that of the housing 12 of the battery 10 in the first embodiment. Therefore, the description of the shape of the housing 112 is omitted. As with the cover 20 in the first embodiment, the cover 120 of the casing 118 is rectangular, and has rounded corners. As shown in the sectional view in FIG. 6, the cover 120 is connected to the housing 112 such that the cover 120 is fitted in the opening of the housing 112. The cover 120 has the through-hole 121 for the positive-electrode terminal 124, and the through-hole 123 for the negative-electrode terminal 126. The through-holes 121 and 123 are formed such that the outer peripheries of the through-holes 121 and 123 are slightly greater than the outer peripheries of the terminals 124 and 126. The terminals 124 and 126 extend from the electrode assembly 116 in the battery 110 through the through-holes 121 and 123. The seal member 135 is formed in the cover 120.

The seal member 135 includes a coating area 127, a seal portion 128, and terminal seal portions 134 and 136. The coating area 127 covers the both surfaces of a metallic plate 122. The seal portion 128 connects the peripheral edge portion of the safety valve 130 to the peripheral edge portion around a vent hole 125. The terminal seal portion 134 connects the peripheral edge portion of the terminal 124 to the peripheral edge portion around the through-hole 121. The terminal seal portion 136 connects the peripheral edge portion of the terminal 126 to the peripheral edge portion around the through-hole 123.

The coating area 127 covers the outer surface and inner surface of the metallic plate 122. The coating area 127 greatly attenuates impacts or vibrations applied from the outside of the battery 110, before they are transmitted to the safety valve 130.

The seal portion 128 is disposed in the inner area of the cover 120. The resin in the peripheral edge portion around the vent hole 125 is thicker than the resin in the coating area 127. The peripheral edge portion of the safety valve 130 is connected to the peripheral edge portion around the opening 125 of the cover 120 such that the entire peripheral edge portion of the safety valve 130 is inserted in the seal portion 128. Thus, the vent hole 125 of the cover 120 is closed. The seal portion 128 connects the peripheral edge portion around the vent hole 125 to the peripheral edge portion of the safety valve 130 such that the peripheral edge portion around the vent hole 125 does not contact the peripheral edge portion of the safety valve 130.

The terminal seal portions 134 and 136 are formed to fill the gaps between the terminals 124 and 126 and the through-holes 121 and 123, respectively. The positive-electrode terminal 124 and the negative-electrode terminal 126 are insulated from each other by the terminal seal portions 134 and 136. In the battery 110 according to the second embodiment, the terminals 124 and 126 extend from the inside of the casing 118 to the outside of the casing 118. In a configuration according to the second embodiment that lacks seal members, loads such as impacts or vibrations are easily applied from the outside of the battery to the areas where the casing 118 is connected to the terminals 124 and 126. However, in this embodiment, because the resin areas (i.e., the terminal seal portions 134 and 136) are formed between the peripheral edge portions around the through-holes 121 and 123, and the terminals 124 and 126, the areas where the casing 118 is connected to the terminals 124 and 126 are hardly damaged.

Grooves 132 are formed in the safety valve 130. The grooves 132 cross each other at the substantially center position in the safety valve 130. If the pressure in the battery 110 increases, the area where the grooves 132 cross each other will break.

Next, the method of assembling the battery 110 will be described. The method of assembling the battery 110 in the second embodiment is the same as the method of assembling the battery 10 in the first embodiment, except for the processes of assembling the cover 120, the safety valve 130, and the coating area 127. Therefore, the description of the same processes as those in the method in the first embodiment will be omitted.

The cover 120 is assembled according to the following procedure. First, the rectangular metallic plate 122 that has rounded corners is prepared. The metallic plate 122 has the through-hole 121, the through-hole 123, and the vent hole 125. The positive-electrode 124 extends through the through-hole 121, and the negative-electrode 126 extends through the through-hole 123. The metallic plate 122 has another through-hole (not shown), through which the electrolytic solution is supplied. The contour of the metallic plate 122 is substantially the same as the contour of the opening of the housing 112. Next, the surface of the entire metallic plate 122 is roughened. Thus, the seal member 135, which is formed on the surface of the metallic plate 122, is tightly connected to the metallic plate 122.

Next, the positive-electrode terminal 124, negative-electrode terminal 126, safety valve 130, and metallic plate 122 are integrated with each other. First, the positive-electrode terminal 124 and the negative-electrode terminal 126 are passed through the through-holes 121 and 123 in the metallic plate 122, respectively. The safety valve 130 is fitted in the vent hole 125. After the metallic plate 122, positive-electrode terminal 124, negative-electrode terminal 126, and safety valve 130 are set in an injection mold according to a predetermined positional relation, synthetic resin is filled in the injection mold. Thus, the seal member 135 is formed, and the metallic plate 122, positive-electrode terminal 124, negative-electrode terminal 126, and safety valve 130 are connected to each other by this insert molding process. That is, the cover 120, safety valve 130, positive-electrode terminal 124, and negative-electrode terminal 126 are solidly connected to each other by the insert molding process. Thus, they are integrated with each other via the seal member 135.

The electrode assembly 116, which has been assembled beforehand, is connected to the positive-electrode terminal 124 and the negative-electrode terminal 126 that extend through the through-holes 121 and 123 of the cover 120. The positive-electrode terminal 124 is welded to the positive-electrode sheet of the electrode assembly 116. The negative-electrode terminal 126 is welded to the negative-electrode sheet of the electrode assembly 116.

Next, the electrode assembly 116, which is connected to the cover 120, is inserted in the housing 112 through the opening of the housing 112. As a result, the cover 120 is fitted in the opening of the housing 112. The peripheral edge portion of the cover 120 may be laser welded to the peripheral edge portion around the opening of the housing 112 at a welding area 114 where the peripheral edge portion of the cover 120 overlaps the peripheral edge portion around the opening of the housing 112. Then, the electrolyte is supplied through the electrolyte-inlet formed in the cover 120. Then, the electrolyte-inlet is tightly closed. Thus, the lithium-ion secondary battery 110 according to the second embodiment is assembled.

Various changes, modifications, deformations, and/or improvements may be made in each of the above-described embodiments. That is, various changes may be made within the spirit and scope of the invention. It is to be understood that the device and method according to the invention are intended to cover all changes, modifications, deformations and/or improvements, which are known or developed later.

For example, the electrode assembly housed in the casing is not limited to a particular electrode assembly, as long as the electrode assembly is the power-generation element that stores and releases a predetermined amount of electric power. The shape and size of the electrode assembly are not limited to a particular shape and particular size. That is, the electrode assembly may have any shape and any size. Typical power-generation elements include various types of primary battery (e.g., a lithium primary battery and a manganese battery), a secondary battery (e.g., a lithium-ion secondary batter, and a nickel-hydrogen battery), or a capacitor (e.g., an electrical double layer capacitor).

The size and shape of the casing of the battery according to the invention may be appropriately changed according to the type, size, shape, and the like of the electrode assembly to be housed in the casing. The casing may be made of metallic material that is resistant to the product of a reaction caused by the power-generation elements such as the electrolyte and the electrode assembly. When the lithium-ion secondary battery is used, the casing may be made of aluminum, steel, or the like. A thin resin coating may be formed on the inner side and outer side of the casing.

The resin used to form the layer that seals the gap between the safety valve and the vent hole may be selected according to the specification temperature of the battery, and/or the liquid characteristic of the electrolyte. When the lithium-ion secondary battery is used, for example, polyolefin resins such as polyethylene and polypropylene, and ethylene-propylene-diene copolymer (EPDM) may be used. Polyphenylene sulfide (PPS) resins, polystyrene resins, polyimide resins, polyamide-imide resins, fluorocarbon resins, polyether ether keton (PEEK) resins, polyether sulfone (PES) resins, and the like may be also used. When the battery that contains a strong alkali electrolyte, such as a nickel-hydrogen battery, is used, alkali-resistant resins may be used. For example, polytetrafluoroethylene (PTFE), polyamide resins, or PEEK resins may be selected.

Technical elements described in the specification or the drawings are effective when one of the technical elements is solely used or a plurality of the technical elements are used in combination. The invention is not limited to the combinations of the technical elements described in the claims on filling. The technology described in the specification or the drawings achieves a plurality of objects at the same time. The technology is effective even when only one of the objects is achieved.

What is claimed is:

1. A battery comprising:
   a metal casing, wherein the casing includes a vent hole that provides communication between an inside of the battery and an outside of the battery;
   a safety valve made of a thin plate; and
   a synthetic resin seal member, provided between a peripheral edge portion around the vent hole and a peripheral edge portion of the safety valve, wherein the seal member indirectly connects the peripheral edge portion around the vent hole of the casing to the peripheral edge portion of the safety valve such that the peripheral edge portion around the vent hole does not contact the peripheral edge portion of the safety valve;
   wherein the seal member extends from an area outside the casing to an area inside the casing; and
   wherein the peripheral edge portion around the vent hole of the casing is indirectly connected to the peripheral edge portion of the safety valve such that the peripheral edge portion around the vent hole and the peripheral edge portion of the safety valve are inserted in the seal member.

2. The battery according to claim 1, wherein the seat member extends on at least one of an outside and an inside of a surface of the casing, in which the vent hole is formed, such that the at least one of the outside and the inside of the surface is coated with the seal member.

3. The battery according to claim 1, wherein the safety valve is more fragile than the casing.

4. The battery according to claim 1, wherein a groove is formed on a surface of the safety valve.

* * * * *